ROGER D. FOSKETT
CLARK E. JOHNSON, Jr.
INVENTORS

BY
*Nicholas A. Pandiscio*

ATTORNEY.

United States Patent Office 3,564,909
Patented Feb. 23, 1971

3,564,909
OPTICAL DYNAMOMETER
Roger D. Foskett, Winchester, and Clark E. Johnson, Jr., Weston, Mass., assignors to Vibrac Corporation, Chelmsford, Mass., a corporation of Massachusetts
Filed Dec. 16, 1968, Ser. No. 784,132
Int. Cl. G01l 3/08
U.S. Cl. 73—136
20 Claims

ABSTRACT OF THE DISCLOSURE

An optical dynamometer involving three optical elements which cooperate to modulate a light beam as a function of power input.

---

This invention relates to apparatus for measuring mechanical power and more particularly to an optical dynamometer.

Optical dynamometers are well known in the art, as shown, for example, in U.S. Pat. 2,938,378. However, prior optical dynamometers have suffered from certain limitations such as excessive complexity of mechanical assemblies, lack of reliability due to improper mechanical design or instabilities in electrical circuitry, and relatively high cost.

Accordingly the primary object of this invention is to provide an optical dynamometer which offers the advantage of relative simplicity, reasonable cost, ease of assembly and alignment of mechanical complements, and reliability under the shock, vibration and other environmental factors imposed during use.

Briefly speaking, the invention involves the use of three elements each characterized by a series of discrete segments wherein alternately occurring segments have a greater light transmittance than the other segments thereof. One of the elements is fixed while the other two elements are mounted on a common shaft so that both will rotate with the shaft but one will rotate relative to the other according to torsional deflection of the shaft. These elements are arranged so as to modulate a light beam, with the modulation of the light beam being a function of the power applied to the shaft. A photoelectric detector is employed to sense the modulated beam, the detector producing an electrical output representative of the power.

The novel features which are believed to be characteristic of the invention, as well as other objects and advantages thereof, are set forth with particularity or are rendered obvious in the following specification which is to be considered with reference to the accompanying drawings in which.

Figure 1:
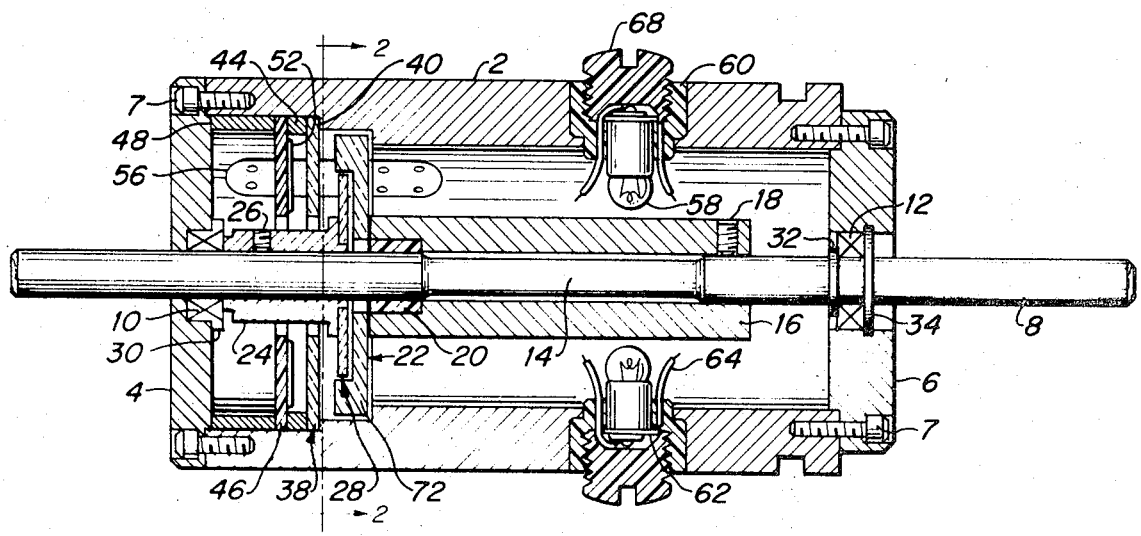
FIG. 1 is a longitudinal sectional view in elevation of a preferred embodiment of the invention.

Referring now to FIG. 1, the preferred embodiment of the invention includes a housing consisting of a circular case 2 having open ends which are closed off by removable end plates 4 and 6. Preferably, but not necessarily, the end plates are attached to the case by means of bolts as shown at 7 so as to facilitate assembly and disassembly. These end plates are provided with aligned center holes in which a torque shaft 8 is supported by means of bearings 10 and 12. The shaft includes a reduced diameter portion 14 intermediate its ends. The cross-sectional area and the length of the portion 14 of the shaft determines the torque range of the device.

Mounted on the torque shaft 8 is a sleeve 16 which surrounds the reduced diameter portion 14. One end of sleeve 16 is securely anchored to the shaft by means of one or more set screws 18. The opposite end of sleeve 16 is counterbored to accommodate a sleeve bearing 20. Attached to this same end of sleeve 16 is a disc 22, details of which are described below. Also mounted on shaft 8 is a second substantially shorter sleeve 24 which is anchored to the shaft 8 by one or more set screws 26. Attached to sleeve 24 at the end which confronts the sleeve 16 is a second disc 28, details of which are also described below. Discs 22 and 28 are preferably cemented on the end faces of sleeves 16 and 24 respectively. However, as an alternative or additional measure, they may be secured to sleeves 16 and 24 by screws or other suitable fastener means. The sleeves 16 and 24 support their respective discs in parallel, axially aligned relation to each other.

Although not shown in detail, it is to be understood that the bearings 10 and 12 are of the roller or ball bearing type, i.e. the type comprising inner and outer races separated by rollers or balls. The outer race of the bearing 10 is provided with a flange 30 which engages the inner face of end plate 4. This flange is maintained in contact with the end plate 4 under the axially directed pressure exerted by sleeve 24. Bearing 12 is captivated between two snap-type retainer rings 32 and 34, the former being mounted in a groove in the shaft 8 and the latter being mounted in a groove in the end plate 6. With this arrangement shaft 8 cannot move axially in either direction, but is capable of rotating relative to the housing. Rotation of shaft 8 causes rotation of discs 22 and 28 which are connected thereto by sleeves 16 and 24. When the shaft 8 is subjected to torque, it will not only rotate but will also give torsionally so as to cause relative angular displacement between the discs 22 and 28. In other words, the two discs will rotate relative to each other according to the degree of torsional deformation of the shaft.

Also forming part of the device is a third disc 38, details of which are presented below. The case 2 is counterbored as shown so as to provide a shoulder 40 against which the disc 38 is held by other elements positioned within the case and retained by end plate 4. These other elements include a spacer ring 44, a printed circuit board 46, and a second spacer ring 48. The printed circuit board is sandwiched between the two spacer rings. The axial gap between disc 38 and the discs 22 and 28 is relatively small, being in the order of ⅛ inch. The gap between disc 38 and printed circuit board 46 is of the same order of magnitude. Both disc 38 and the printed circuit board 46 have center holes sized and aligned so as to allow sleeve 24 to rotate freely.

Figure 3:
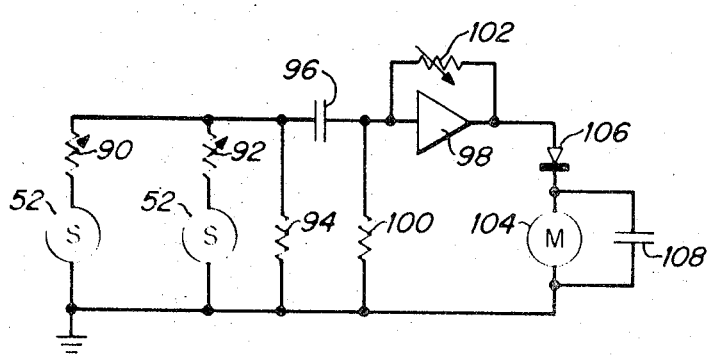
FIG. 3 is a schematic diagram of one form of circuit embodied with the device of FIG. 1.

The printed circuit board 46 carries some of the components of the circuit shown in FIG. 3. Among these components are two photovoltaic cells illustrated schematically at 52 in FIG. 1. In the illustrated embodiment the photosensitive units 52 are mounted in diametrically opposed relation with each other and are as identical as possible. Although not shown, it is to be understood that the printed circuit board 46 is provided with conductive terminal portions on one side thereof which are coupled by flexible leads to a multi-contact terminal connector 56 which is securely mounted in a suitable aperture in the wall of case 2. The connector 56 may be of any suitable conventional design having exterior contact terminals whereby the electrical elements mounted with case 2 may be coupled to other elements of the electrical circuit associated therewith, e.g., elements of the preferred form of circuit shown in FIG. 3. Preferably connector 56 is of the multi-pin type which is adapted to mate with a complementary male or female connector.

The light which is modulated by discs 22, 28 and 42 is provided by an appropriate light source which, in the illustrated embodiment of the invention, comprises two miniature bulbs 58 which may be of the type used in flashlights. These bulbs are mounted in plastic bushings 60 which are press fitted in diametrically opposed holes formed in the wall of case 2. Each of the bulbs has a flange 62 which engages the inner surface of the bushing and thus limits the extent to which the bulb can project into the case. Each bushing is fitted with two insulated lead wires 64 which are connected to the terminals of the bulb. The opposite ends of these lead wires are connected to appropriate terminals of the connector 56. The bulbs are held in place by plastic plugs 68 which screw into the bushings.

Figure 2:
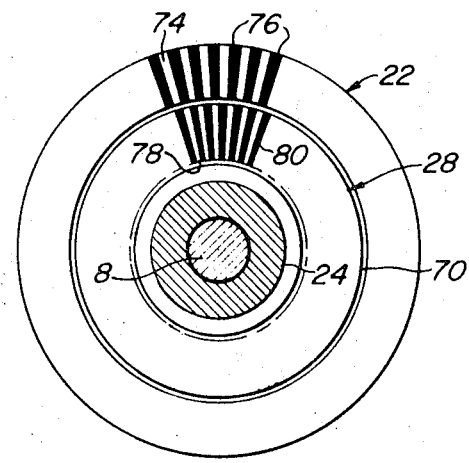
FIG. 2 is a cross-sectional view taken along line 2—2 of FIG. 1.

Turning now to FIGS. 1 and 2, the disc 22 comprises a first inner annular portion 70 which is relatively thin and is relatively highly transmissive with respect to the light from bulbs 58, and a second outer portion 72 which is relatively thick and is characterized by two series of radially extending equiangular sectors 74 and 76 which are disposed in alternating occurring relation to each other, the sectors 74 being relatively highly transmissive and the sectors 76 being relatively lowly transmissive with respect to the light from bulbs 58. Preferably but not necessarily, the sectors 74 are substantially transparent and the sectors 76 are substantially opaque. Although not shown in FIG. 2, it is to be understood that the series of sectors 74 and 76 extend through a full 360 degrees.

According to the preferred mode of practicing this invention, the disc 22 is made of a light transmisive, dimensionally stable material such as glass or a clear plastic such as an acrylic polymer, or the like, and the pattern of sectors is formed by photolithographic methods and the like. For example, the sectors may be formed by (a) coating one surface of a glass disc with a photographic emulsion, (b) projecting onto the emulsion a pattern corresponding to the sectors 74 and 76 so as to form a latent image thereon, and (c) developing and fixing the image. Alternatively, the same results may be achieved by vacuum depositing an opaque film onto one surface of a highly light transmissive disc through a mask having open areas corresponding to the sectors 76. Another approach is to make the outer portion 72 of an opaque material and to cut slits conforming to sectors 74. Whatever the method of making disc 22, the sectors 74 and 76 are of equal area and subtend the same angle, i.e., at corresponding radial distances from the center of rotation they are equal in width.

The disc 28 also is characterized by two series of radially extending equiangular sectors 78 and 80 which are disposed in alternately occurring relation to each other, the sectors 78 being relatively highly transmissive and the sectors 80 being relatively lowly transmissive with respect to the light from bulbs 58. Although not shown, it is to be understood that the sectors 78 and 80 extend through a full 360 degrees. Disc 28 is disposed so that sectors 78 and 80 are substantially coplanar and concentric with the sectors on the disc 22. The sectors of disc 28 subtend the same angle as those of disc 22. However, the discs are disposed so that with no torque applied to shaft 8, the sectors 80 are 180 degrees out of phase with the corresponding sectors 76 of disc 22; that is, the sectors 80 are aligned radially with the sectors 74. Additionally, the sectors 78 and 80 are longer radially than sectors 74 and 76 by an amount such that each sector has the same area as every other sector of discs 22 and 28 as viewed in FIG. 2. The sectors 78 and 80 are formed by the same method as sectors 74 and 76, preferably with sectors 78 being transparent and sectors 80 being opaque.

Although not shown in detail, it is to be understood that disc 38 has a pattern of sectors of alternately high and low light transmissibility corresponding to the sector patterns of discs 22 and 28 but differing in that the inner and outer ends of the sectors of disc 38 are at the same radii as the inner ends of sectors 78 and 80 and the outer ends of sectors 74 and 76, so that when the shaft 8 is rotated the sectors of disc 38 cooperate with the sectors of discs 22 and 28 to modulate the light from bulbs 58 with respect to the photocells 52. Although not shown, it is to be appreciated also that the inner and outer marginal portions of disc 38 are substantially opaque to the light from bulbs 58 so that light can pass to the photocells only by way of alignment of the sectors 74 and 78 with the corresponding highly light transmissive sectors of disc 38.

Figure 4:
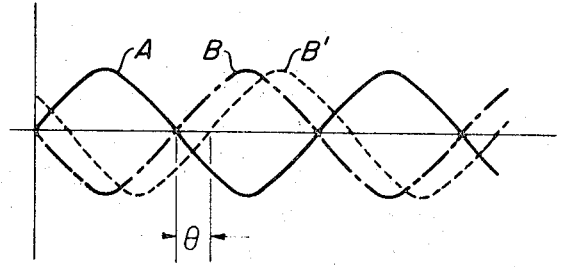
FIG. 4 is a graph showing the wave shapes and phase relationship of output electrical signals produced by the photoelectric detector.

From the foregoing description, it is believed to be apparent when the shaft 8 is rotated, the discs 22 and 28 will both rotate relative to the disc 38 at the same speed. Accordingly, light from bulbs 58 will be modulated by the cooperative action of disc 22 and disc 38 at the same frequency as light from bulbs 58 is modulated by the cooperative action of disc 28 and disc 38. Hence the light impinging on photocells 52 will cause the latter to generate two comparably modulated electrical signals with a frequency indicative of the angular velocity of shaft 8. Assuming no torque, the maximum and minimum of light transmissions via the sector patterns of the discs 22 and 38 will vary optically 180 degrees from the maximum and minimum of light transmissions via the sector patterns of discs 28 and 38. Accordingly, as shown in FIG. 4, the two electrical signals, identified as waveforms A and B, also will be 180 degrees out of phase. However, application of torque to shaft 8 will cause relative rotation between discs 22 and 28 by an amount proportional to the amount of torque, with the result that the maxima and minima of light transmissions via the secor patterns of discs 22 and 38 will undergo a shift in phase relative to the maxima and minima of light transmissions via the sector patterns of discs 28 and 38. Accordingly, the two electrical signals will undergo a corresponding shift in phase, as shown in FIG. 4 where the waveform B′ represents the waveform B phase-shifted by an angle which is proportional to the degree of torque.

Assuming that the photocells are of the type which generate a voltage when energized by incident light and also that they are connected in parallel as shown in FIG. 3, they will produce an output voltage whose A.C. component is made up of two components, one represented as $\sin wt$ and the other as $(wt+\pi+\theta)$, where $w$ is the frequency of the electrical signal multiplied by $2\pi$, $t$ is the time in seconds, and $\theta$ is the phase shift angle and is proportional to the twist or torsion of shaft 8. Essentially, therefore, the output voltage $Vo$ of the photocells is represented as follows:

$$Vo = \sin wt + \sin (wt+\pi+\theta) + \text{D.C. component} \quad (1)$$

The D.C. component is due to the average light intensity falling on the photocells, the energy being a scalar, positive quantity.

By substitution of identities, Equation 1 may be converted to:

$$Vo = \sin wt \ (1-\cos \theta) - \cos wt \ \sin \theta + \text{D.C. component} \quad (2)$$

By further analysis $Vo$ may be alternately represented as $$Vo = A \sin wt + \text{D.C. component} \quad (3)$$

where $A$ is the amplitude of the A.C. portion of $Vo$ and is the vector sum of the coefficients $(1-\cos \theta)$ and $\sin \theta$ derived from Equation 2 above. Given $$A = \sqrt{(1-\cos \theta)^2 + \sin^2 \theta} \quad (4)$$

it follows that $$A = \sqrt{1 - 2 \cos \theta + \cos^2 \theta + \sin^2 \theta} \quad (5)$$

From Equation 5 it can be found that $$A = \sqrt{2(1-\cos\theta)} \cong \sqrt{\theta^2 - \frac{\theta^4}{12}} = \theta\sqrt{1-\frac{\theta^2}{12}}$$

Hence A is proportional to $\theta$ and the correction factor $$\sqrt{1-\frac{\theta^2}{12}}$$

which can be ignored when $\theta$ is small. For a dynamometer to be accurate to $\pm\frac{1}{2}\%$, $\theta$ must be less than about 28 degrees. If an error as much as $\pm 1\%$ is tolerated, $\theta$ may be almost 40 degrees.

It follows from Equation 3 above that if the output signal Vo is differentiated, the D.C. component is eliminated and the differentiated signal may be represented as $$\frac{dVo}{dt} = Aw\ \cos\ wt$$

Since A is proportional to torque and $w$ is proportional to shaft speed, it follows that the differentiated signal is a sinusoidally varying A.C. signal having an amplitude proportional to power. If this signal is rectified it is possible to produce a varying D.C. signal indicative of power which may be used to drive a suitable indicating unit.

With the foregoing explanation in mind, reference is now made to FIG. 3 which illustrates a preferred form of the circuitry required to complete the invention. In FIG. 3, the photocells 52 are connected in series with separate variable resistors 90 and 92 and in parallel with a load resistor 94. The variable resistors serve to trim the outputs of the two photocells. One end of load resistor 94 is connected to ground. The other end of the load resistor 94 is connected by a capacitor 96 to the input terminal of an amplifier 98. The same input terminal is connected to ground via a resistor 100. Capacitor 96 and resistor 100 form a differentiating circuit. The gain of amplifier 98 is adjusted by means of a variable resistor 102 which is connected in feedback relation between its output and input terminals. The output of the amplifier is applied to one side of a D.C. voltmeter 104 through a diode 106. The other side of the voltmeter is connected to ground. A capacitor 108 is connected across the meter.

It is believed clear that the alternating signal produced by the photocells is differentiated by the circuit comprising capacitor 96 and resistor 100, then amplified in amplifier 98, rectified by diode 106, and then measured by meter 104. Rectification provides a D.C. signal having an average value proportional to A$w$. The capacitor 108 serves to shunt A.C. ripple around the meter. Since the meter is operated by a signal which is directly proportional to power, the meter may be and preferably is provided with a scale calibrated directly in units of power.

It is believed to be apparent that only one photocell may be used and also that the two photocells need not be located in diametrically opposed relation to each other. However, using two photocells displaced 180 degrees from each other is preferred because it eliminates signal fluctuations caused by shaft eccentricity. Using two photocells also offers the advantage that they can be wiggled radially during assembly and calibration so as to get a balanced output therefrom. It also is possible to use a single annular photocell.

It also is obvious that the disc 38 and its pattern of sectors need not extend through a full 360 degrees. Instead it may be replaced by a plate with sectors sufficient in number to cover only a limited angle, e.g., 90 degrees, in which case the photocell (or photocells) is arranged to receive only light passing through the plate. Obviously a plurality of such plates may be mounted at different points about the shaft, preferably but not necessarily in a symmetrical array.

It also is contemplated that the photodetectors need not be photovoltaic but may be of the type which changes resistance or conductance when exposed to light, in which case the circuit of FIG. 3 would be modified to include a source of potential. Specifically, the photodetectors may be photodiodes or phototransistors. Any D.C. output occurring under conditions of zero torque can be nulled by using a null balance meter or by applying a variable bucking signal to the meter in a manner well known in the art.

It is appreciated also that many other modifications and variations of the device herein illustrated and described may be made without departing from the scope of the invention herein involved. Therefore, all matter contained in the above description or shown in the drawings shall be interpreted in an illustrative and not in a limiting sense.

What is claimed is:

1. A dynamometer comprising a shaft support means supporting said shaft for rotation, first and second discs mounted on said shaft so as to rotate therewith and also so as to undergo rotational displacement with respect to one another in response to torsional displacement of said shaft, each of said first and second discs having a first series of segments of relatively high light transmittance and a second series of segments of relatively low light transmittance arranged in a coaxial array about said shaft with the segments of said first series occurring alternately with the segments of said second series, the segments of said first disc being located further than the segments of said second disc from the axis of said shaft, a member on one side of said first disc having a first series of segments of relatively high light transmittance and a second series of segments of relatively low light transmittance arranged coaxially with said shaft with the segments of said first series occurring alternately with the segments of said second series, the segments of said member being disposed in cooperating light interfering relation with the segments of said first and second discs, means connected to said support means for holding said member against movement, photosensitive light detecting means for providing an electrical signal in response to the amount of light impinging thereon, illuminating means including a source of light for directing light to said light detecting means through said discs and said member, whereby said light detecting means will produce an electrical signal that varies according to the speed of rotation of said discs relative to said member and the angular displacement of said first disc relative to said second disc, means for differentiating the electrical signal produced by said light detecting means, and means responsive to said differentiated signal for providing an output indicative of the magnitude of the power employed to rotate said shaft.

2. A dynamometer as defined by claim 1 wherein under zero torque condition each segment of relatively low light transmittance of said first disc is aligned with a segment of relatively high light transmittance of said second disc.

3. A dynamometer as defined by claim 1 wherein the segments of said first disc are arranged in an array which is concentric to the segments of said second disc.

4. A dynamometer as defined by claim 1 wherein said discs have an equal number of segments.

5. A dynamometer as defined by claim 4 wherein said discs have an equal number of segments of relatively high light transmittance and an equal number of segments of relatively low light transmittance.

6. A dynamometer as defined by claim 1 wherein said segments of relatively low light transmittance are opaque to visible light.

7. A dynamometer as defined by claim 1 wherein said member is a disc.

8. A dynamometer as defined by claim 1 wherein the segments of said member subtend the same angle as the segments of said discs.

9. A dynamometer comprising a shaft; means supporting said shaft for rotation; illuminating means; signal generating means including photosensitive means positioned to receive light from said illuminating means for providing an electrical signal that varies in accordance with variations in the amount of light received by said photosensitive means; light modulating means disposed in the path of light passing from said illuminating means to said photosensitive means for modulating the light received by said photosensitive means from said illuminating means so that the signal provided by said signal generating means varies according to the speed of rotation and the torque of said shaft; said light modulating means comprising (a) first and second discs mounted on said shaft so as to rotate therewith and also so as to undergo angular displacement relative to each other in response to torsional deformation of said shaft, and (b) a stationary member, said discs each having a series of alternately occurring relatively high light transmittance areas and relatively low light transmittance areas with each series arranged coaxially with said shaft, said member also having a series of alternately occurring relatively high light transmittance areas and relatively low light transmittance areas, the said series of said discs and said member being disposed so that the said areas of said first disc and said member constitute a first light interfering means for modulating the light received by said photosensitive means according to shaft speed and the said areas of said second disc and said member form a second light interfering means for modulating the amount of light received by said photosensitive means according to shaft speed, the said series of said discs also being disposed so that the maxima and minima of light transmission via said first light interfering means will undergo a shift in phase relative to the maxima and minima of light transmission via said second light interfering means in response to relative angular displacement of said discs, and circuit means responsive to the signal produced by said signal generating means for providing an output signal representative of the power transmitted by said shaft.

10. A dynamometer according to claim 9 wherein said circuit means comprises means for differentiating the signal produced by said signal generating means and means for producing said output signal from said differentiated signal.

11. A dynamometer according to claim 10 wherein said last-mentioned means includes means for rectifying said differentiated signal.

12. A dynamometer according to claim 11 further including means responsive to the output of said rectifying means for indicating the amount of power transmitted by said shaft.

13. A dynamometer according to claim 9 wherein said circuit means includes an amplifier for amplifying the signal produced by said signal generating means.

14. A dynamometer according to claim 9 wherein said signal generating means includes at least two photosensitive means displaced angularly about the axis of said shaft.

15. A dynamometer according to claim 9 wherein said signal generating means comprises two photosensitive means displaced approximately 180 degrees from each other about the axis of said shaft.

16. A dynamometer according to claim 9 wherein said photosensitive means comprises an annular photocell.

17. A dynamometer comprising a housing, a shaft; means rotatably supporting said shaft in said housing; illuminating means in said housing; signal generating means including a photoelectric means mounted in said housing in position to receive light from said illumination means for providing an electrical signal that varies in accordance with variations in the amount of light received by said photoelectric means; light modulating means for modulating the light directed at said photoelectric means by said illuminating means so that said signal generating means will produce a signal output that varies in accordance with the speed of rotation and the torque of said shaft, said light modulating means comprising (1) a first member secured in said housing having a series of alternately occurring relatively high light transmittance areas and relatively low light transmittance areas and (2) second and third members mounted on said shaft so as to rotate therewith and also so as to undergo angular displacement relative to each other in response to the torque applied to said shaft, said second and third members each having a series of alternately occurring relatively high light transmittance areas and relatively low light transmittance areas, the said areas of said members being disposed about the axis of said shaft so that said members modulate the light received by said photoelectric means according to shaft speed and the relative angular displacement of said second and third members; and means for deriving from the signal output of said signal generating means produced in response to the modulated light received by said photoelectric means a signal representative of the power applied to said shaft.

18. A dynamometer according to claim 17 wherein light passes from said illuminating means to said photoelectric means via first and second paths, with the said areas of said first and second members disposed in said first path and the said areas of said first and third members disposed in said second path so that the maxima and minima of light transmission along said first path undergo a shift in phase relative to the maxima and minima of light transmission along said second path according to the relative angular displacement of said second and third members.

19. A dynamometer according to claim 17 wherein said signal generating means includes means for differentiating and rectifying said signal output and means for measuring said differentiated and rectified signal output.

20. A dynamometer according to claim 17 wherein said second and third members are circular discs with one of said discs having an annular portion that surrounds and is substantially coplanar with the other disc, said annular portion comprising the said areas of said one disc, and further wherein said discs have the same number of relatively high and relatively low light transmittance areas with the areas of said one disc subtending the same angles as the corresponding areas of the other disc.

References Cited
UNITED STATES PATENTS

| | | | |
|---|---|---|---|
| 2,938,378 | 5/1960 | Canada et al. | 73—136 |
| 3,111,028 | 11/1963 | Lebow | 73—136 |

CHARLES A. RUEHL, Primary Examiner